Figure 1:
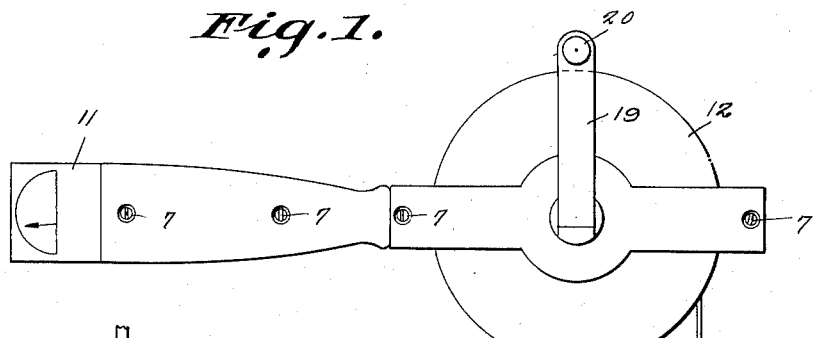

April 15, 1952   G. E. BOOTH   2,593,252
GALVANIC BATTERY
Filed Nov. 12, 1946

G. E. Booth
INVENTOR

BY 
ATTORNEYS

Patented Apr. 15, 1952

2,593,252

UNITED STATES PATENT OFFICE 2,593,252

GALVANIC BATTERY

George E. Booth, Long Beach, Calif.

Application November 12, 1946, Serial No. 709,211

2 Claims. (Cl. 136—100)

This invention relates to water-level gauges such as are used in gauging liquids in gasoline and oil tanks.

It is a common practice in the industry to float liquids, such as crude oil, on water, and need exists for regularly gauging the amount of water, and often the temperature thereof, in a tank used for such purpose. Gauges, which quite commonly embody the use of a tape by means of which a gauge is lowered into the tank, have been devised for this purpose, but have been found to be not entirely safe in use, by reason of the fact that static electricity is often present, and may cause explosion of gas fumes present in the tank. It has been necessary for the gauger in such instances to ground his tape and reel to the tank to avoid this possibility, but this practice has not been found to be entirely satisfactory.

An important object of the invention, therefore, is to provide a gauge of the character described which will not require the use of a grounding device to eliminate static electricity, thus providing a desirable safety feature.

A second important object of the invention is to provide a gauge which is so constructed as to be operable as a water-level indicating gauge.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Figure 2:
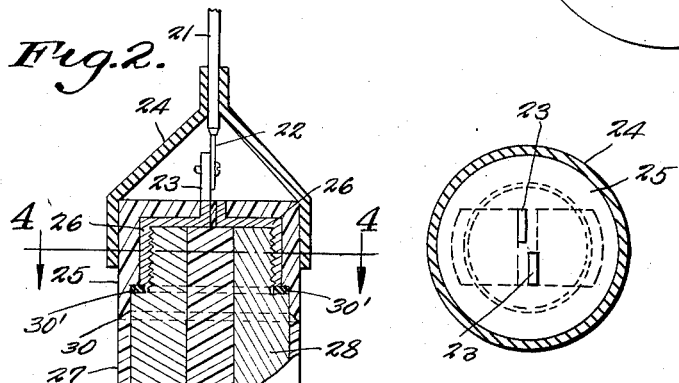
Figure 3:
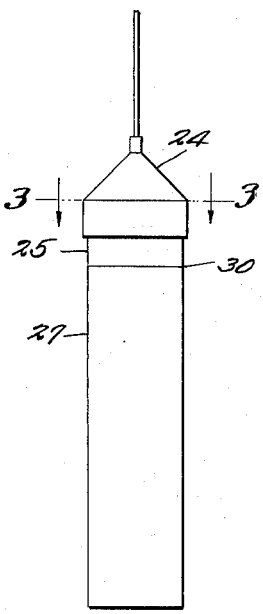
Figure 4:
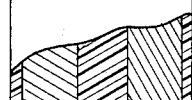

Fig. 1 is a side view in elevation of a gauging device embodying the features of this invention and showing a meter attached to the handle portion thereof, Fig. 2 is an enlarged side view partially in section of a galvanic action sinker embodying the features of this invention, Fig. 3 is an enlarged horizontal sectional view taken substantially along the line 3—3 of Fig. 1, and Fig. 4 is a horizontal sectional view taken substantially along the line 4—4 of Fig. 2.

Carried by a reel 12 is a flexible insulated tape 21 which is calibrated in feet, inches, and fractions of inches, and encloses and insulates flexible electrically conductive strips having their lower ends of the strips secured to upwardly projecting prongs 23. These prongs 23 are sealed against moisture in a rubber cap 24 of a socket embodying in addition a plastic cylindrical cup 25, and electrically conductive strips or contacts 26 are molded into the walls of the cup. At their upper ends, the strips 26 are formed into the prongs 23. Threads are turned in the inner wall of the cup 25 and aligned inner sides of the metal strips 26, for receiving the threaded upper end of a galvanic plumb bob or thermocouple.

Threaded into the socket, which constitutes an upper section of the plumb bob, is a lower section embodying a cylindrical plastic shell 27, open at both ends, there being electrically conductive bars or electrodes 28 extending through the shell and formed of metals of different electrical potentials, and a plastic insulating bar 29 also extending through the shell, between the conductive bars 28. One bar 28, for example, can be copper or carbon (positive metals) while the other bar can be zinc or magnesium (negative metals). As is clearly shown by Figure 2, in which the reference numeral 30 indicates the upper edge of the shell 27 and the lower edge of the socket, the upper ends of the plastic bar 29 and conductive bars 28 extend above the upper edge 30 of the shell 27, forming a composite cylindrical portion of reduced circumference, having threads cooperating with the interior threads on the composite inner wall of the socket. When the lower section has been threaded into the socket, the conductive bars 28 thereof are positioned against the strips 26 in the socket, forming a connection through which electrical current may pass. A rubber gasket 30' serves to make the connection water-tight.

It is to be noted that the lower section has a blunt or flat lower end, whereby the lower ends of the bars 28 are afforded the greatest possible contact with the electrically conductive liquid, the level of which is being gauged.

In operation the sinker is attached to the conductive strips of the tape 21 and lowered into the tank which is to be gauged. Upon contacting the water beneath the oil in the tank, electrical energy will be generated in the conductive bars 28 and will pass through the conductive strips in the tape 21 to any suitable meter which may be carried by the reel frame.

What is claimed is:

1. In a sensing device for determining fluid levels a galvanic action sinker comprising: a socket of insulating material, spaced terminal contacts in the socket, internal screw threads carried by the socket and the contacts, an elongated tubular shell of insulating material, spaced electrodes of different potentials extending longitudinally through the shell, an insulating bar interposed between the electrodes, lugs carried by the bar and by the electrodes and projecting longitudinally beyond one end of the shell, and external screw threads carried by the lugs for threaded engagement with the threads in the socket whereby electrical communication will be established between the electrodes and the contacts.

2. In a sensing device for determining fluid levels a galvanic action sinker comprising: an upper section including a rubber cap of inverted cup-like formation and having a center opening at its upper end for insertion of an electrically conductive tape, an inverted cup of insulating material fitted into said cap, and spaced terminal contacts secured within said cup, said contacts projecting upwardly at one end from said cup for connection to an inserted tape, the contacts having their other ends recessed within the side wall of said cup, said side wall of the cup being formed with internal threads constituted compositely of the insulating material and the contacts; and a lower section including an outer shell of insulating material, spaced electrodes of different potentials extending through the shell, and an insulating bar interposed between the electrodes, the upper ends of the bar and electrodes projecting above the shell and being formed as an exteriorly threaded cylindrical portion threadable into the socket for engagement of the electrodes with the contacts, the electrodes being exposed at their lower ends for contact with an electrically conductive fluid.

GEORGE E. BOOTH.

REFERENCES CITED

The following references are of record in the file of this patent:

UNITED STATES PATENTS

| Number | Name | Date |
| --- | --- | --- |
| 1,443,357 | Gardner | Jan. 30, 1923 |
| 1,498,960 | Gardner | June 24, 1924 |
| 1,786,196 | Ennis | Dec. 23, 1930 |
| 1,818,221 | Huber | Aug. 11, 1931 |
| 1,822,203 | Collins | Sept. 8, 1931 |
| 1,947,592 | Haller | Feb. 20, 1934 |
| 2,127,875 | Lippert et al. | Aug. 23, 1938 |
| 2,139,810 | Duncan | Dec. 13, 1938 |
| 2,229,036 | Bird et al. | Jan. 21, 1941 |
| 2,463,427 | Richards | Mar. 1, 1949 |
| 2,480,490 | Mark | Aug. 30, 1949 |